Aug. 25, 1959     H. S. HARRISON     2,900,709
AUTOMATIC VALVE STEM INSERTER Filed Jan. 10, 1956     10 Sheets-Sheet 1

INVENTOR.
HOMER S. HARRISON
BY

ATTORNEYS.

Aug. 25, 1959     H. S. HARRISON     2,900,709
AUTOMATIC VALVE STEM INSERTER

Filed Jan. 10, 1956     10 Sheets-Sheet 2

INVENTOR.
HOMER S. HARRISON
BY

ATTORNEYS

Aug. 25, 1959          H. S. HARRISON          2,900,709
AUTOMATIC VALVE STEM INSERTER
Filed Jan. 10, 1956                                        10 Sheets-Sheet 8

INVENTOR.
HOMER S. HARRISON
BY
Farley Forster & Farley
ATTORNEYS

United States Patent Office 2,900,709
Patented Aug. 25, 1959

2,900,709

AUTOMATIC VALVE STEM INSERTER

Homer S. Harrison, Birmingham, Mich., assignor to Allied Steel and Conveyors, Inc., Detroit, Mich., a corporation of Michigan Application January 10, 1956, Serial No. 558,368

18 Claims. (Cl. 29—211)

This invention relates to an automatic valve inserting machine, particularly adapted for automotive tubeless tire wheels. The conventional tubeless tire wheel has a circular hole punched through the rim for housing a rubber valve body which is generally conical in form to facilitate insertion from the inside of the wheel and is provided with an annular groove adapted to engage the metal periphery around the valve hole, the inner end of the valve body being provided with a somewhat enlarged shoulder for sealingly engaging the inside of the wheel rim under internal air pressure of an inflated tire. The rubber valve body is constructed with a through axial passage in which the valve mechanism proper is embedded, the metal valve stem extending beyond the outer end and short of the inner end of the valve body.

The operations of the present machine for automatically inserting such valves in metal wheel rims include the synchronized conveyance of wheels and valves to an assembly position, mechanical insertion of the valves and conveyance of the wheels away from the assembly position. In order to effect these operations efficiently, provision is made to start each assembly operation in response to a wheel approaching the assembly position along a conveyor surface, to raise and rotate the wheel until the valve hole reaches an assembly plane and alignment with the valve inserter, to hold the wheel in such position while the valve stem is mechanically inserted and thereupon return the wheel to the conveyor surface. Provision is made to automatically feed valves from a bulk hopper, lubricating the outer surface of each valve to facilitate insertion, and move it to a position where an inserter engages it, transports it to a wheel and presses it into assembled position.

Accordingly, the principal object of the present invention is to provide a completely automatic machine for conveying wheels and valves to an assembly position, for inserting the valves and for conveying the assembled wheel unit away from the assembly position.

Another object is to provide automatic means for synchronizing the valve assembly operation regardless of the spacing of the wheels on the conveyor or the position of the hole in the wheel relative to the final assembly position.

Another object is to provide means for starting an assembly operation in response to the approach of a wheel on the conveyor toward the assembly position.

Another object is to provide means for retarding succeeding wheels on the conveyor while a valve is being assembled in a preceding wheel.

Another object is to provide means for rotating a wheel to a position where the valve hole is properly aligned for valve insertion.

Another object is to provide means for conveying individual valves from a bulk hopper to an assembly position.

Another object is to provide automatic means for lubricating the valves prior to insertion.

Another object is to provide valve inserting mechanism for engaging a valve and pressing it into assembled position in the wheel.

Another object is to provide pressure limiting means for assuring proper assembly without damage to the valve body notwithstanding commercial tolerance variations in the wheel hole location, valve and condition of the hole surface.

These and other objects will be more apparent from the following detailed description of a preferred embodiment of my automatic valve inserting machine as disclosed in the drawings wherein.

Figure 1:
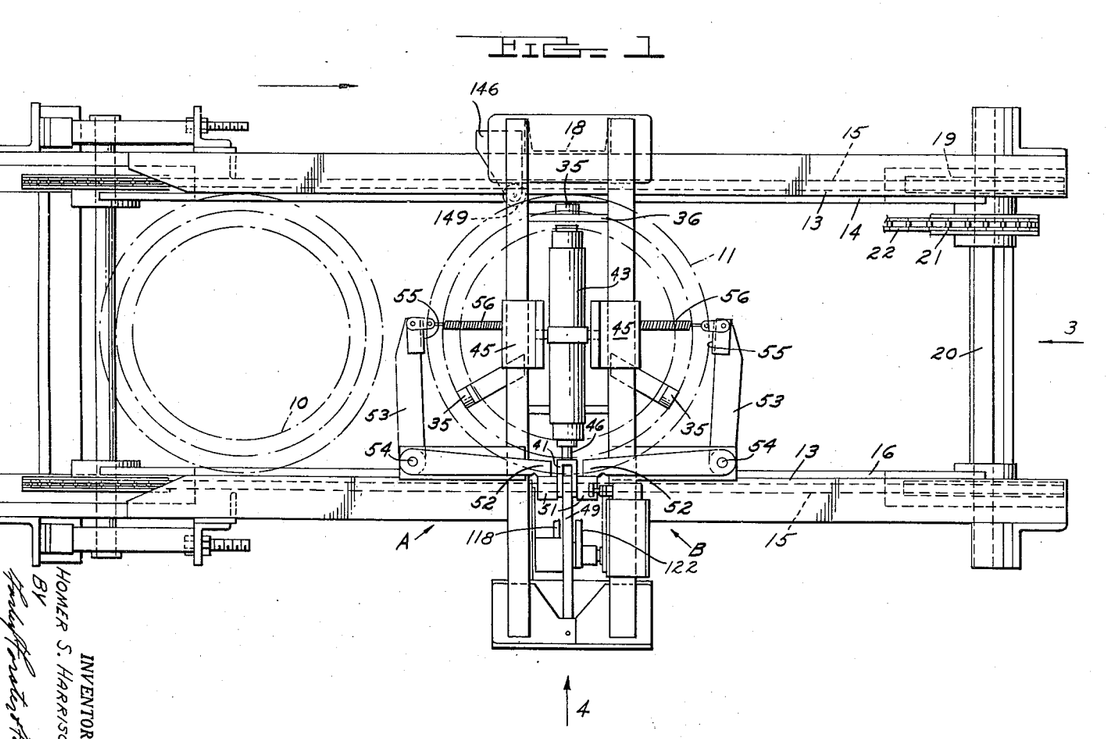
Fig. 1 is a plan view of the machine taken along the line 1—1 of Fig. 3.
Figure 3:
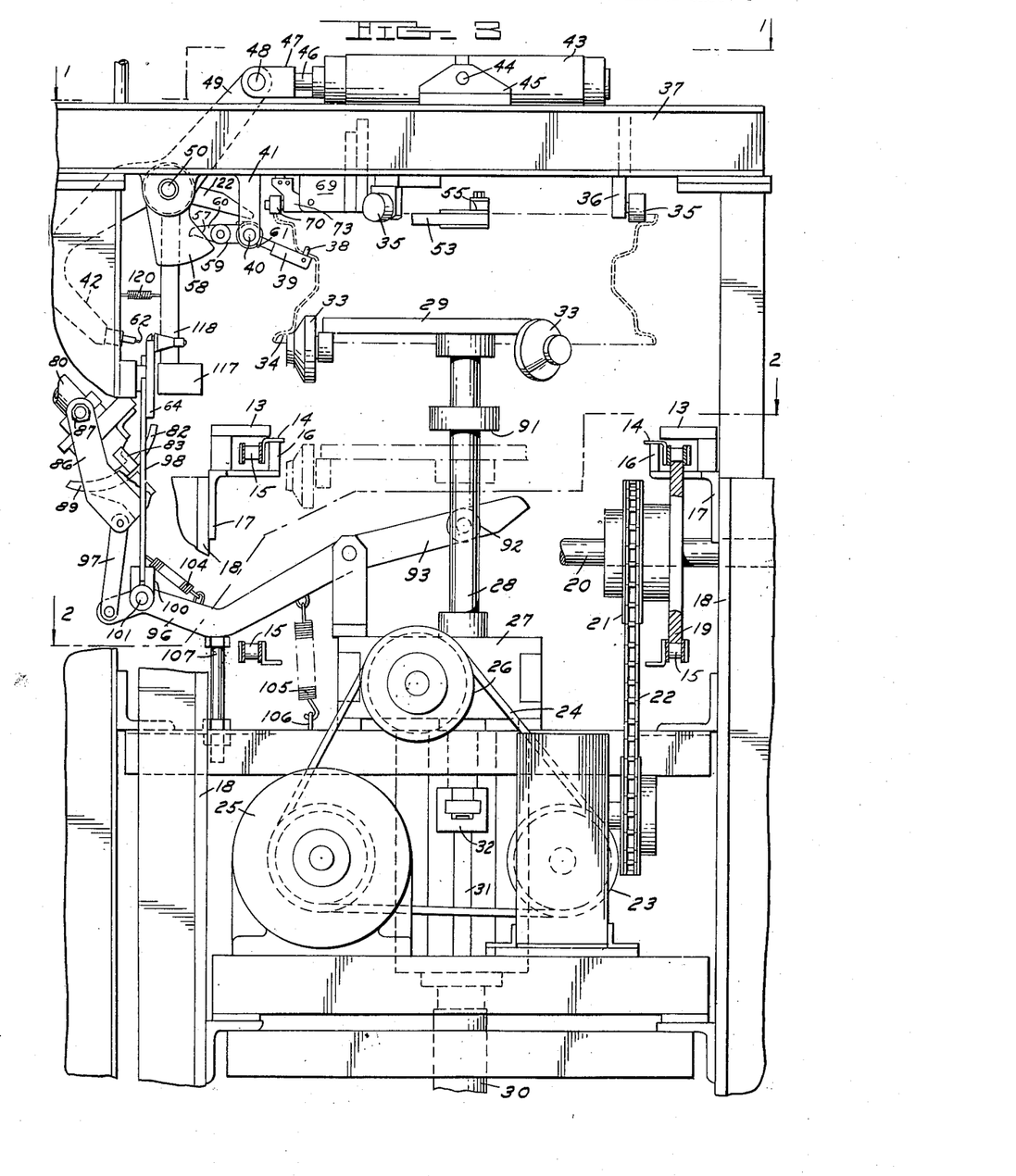
Fig. 3 is an end elevation taken along the line 3 of Fig. 1.

With reference to Fig. 1, in the general operation of the machine a wheel 10 passes from the left end of the conveyor A to a position 11 under the valve insert mechanism B where it is raised to a valve assembly position, then lowered back to the conveyor and moved to the right for subsequent tire mounting operations which form no part of the present disclosure. While on the conveyor, the wheel travels between fixed guide rails 13 on a moving conveyor surface 14 at either side of the machine which, as best shown in Fig. 3, is formed by a series of angles attached to conveyor chain 15, the angles riding on a fixed supporting rail 16 attached by brackets 17 to the frame 18 of the machine.

Figure 2:
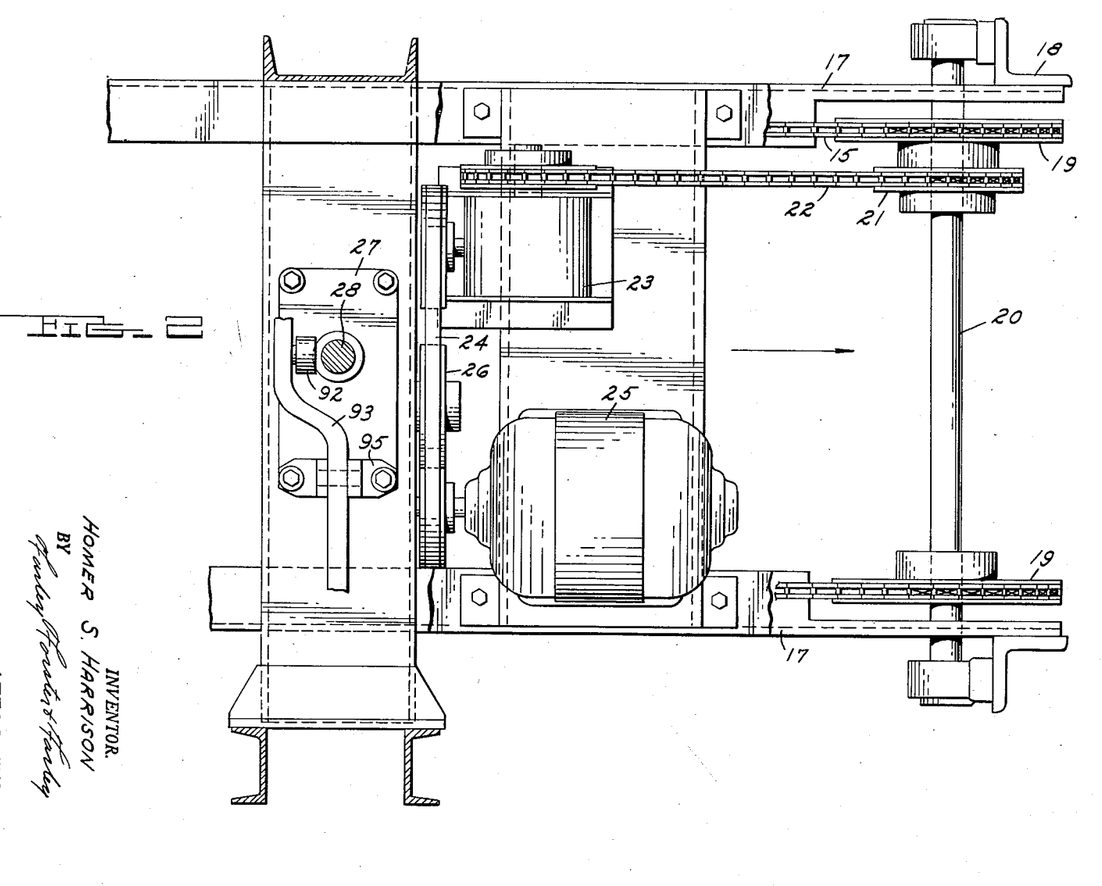
Fig. 2 is a plan view taken along the line 2—2 of Fig. 3.

As best shown in Fig. 2, the conveyor chains 15 are driven by a pair of sprockets 19, cross shaft 20, drive sprocket 21, drive chain 22, reduction gearing 23, drive chain 24, and motor 25, which drives the conveyor continuously while the machine is in operation. The motor 25 also continuously drives sprocket 26 which, through reduction gearing 27, rotates the vertical shaft 28 on the upper end of which is mounted a wheel platten 29, the reduction gearing 27 driving a gear (not shown) splined to the shaft 28 for slidable drive in a manner whereby the shaft 28 may be raised and lowered by an air cylinder 30, piston rod 31, and thrust coupling 32.

Three equally spaced contoured rollers 33 rotatably mounted on the platten 29 are adapted to engage the inner flange 34 of a wheel when centrally positioned on the conveyor over the platten 29 upon raising the wheel through actuation of the air cylinder 30. The frictional resistance to rotation of the rollers 33 will impart an accelerating rotational drive to the wheel during its upward travel, which rotation will continue after the wheel has reached an uppermost position limited by three equally spaced antifriction rollers 35 rotatably mounted in a fixed position through brackets 36 to the upper frame 37 of the machine, the lower frictional bearing resistance of the anti-friction roller 35 compared to that of the rollers 33, permitting such continued wheel rotation.

A dog 38 on a spring loaded lever 39 pivotally mounted at 40 to stationary bracket 41 is adapted to engage the valve hole in the wheel and stop the wheel's rotation when the hole has reached a position aligned with the valve insert lever 42 whereupon the platten 29 and rollers 33 continue to rotate and support the stationary wheel rim 34 during the succeeding valve assembly operation.

An air cylinder 43 pivotally mounted at 44 on stationary brackets 45 is adapted to actuate the valve insert lever 42 through a piston rod 46 and yoke 47 pivotally connected at 48 to an extension 49 of the lever 42 which is in turn pivotally connected at 50 to stationary bracket members. When the piston rod 46 is in its retracted position, as shown in Figs. 1 and 3, stops 51 mounted on either side of the yoke member 47 engage the ends 52 of bell crank members 53 pivotally mounted at 54 to stationary brackets and hold wheel braking elements 55 in a disengaged position against the tension of springs 56. As the piston rod 46 begins its outward travel, movement of the stops 51 permits springs 56 to set the brake elements 55 against the rim of the wheel 11 to prevent rotation when the dog 38 is withdrawn from the valve hole in the wheel. Such withdrawal is effected against the tension of spring 61 upon progressive movement of the valve insert lever 42 through the engagement of cam surface 57 on a lever extension 58 with a roller 59 on an extension 60 of the lever 39.

Figure 11:
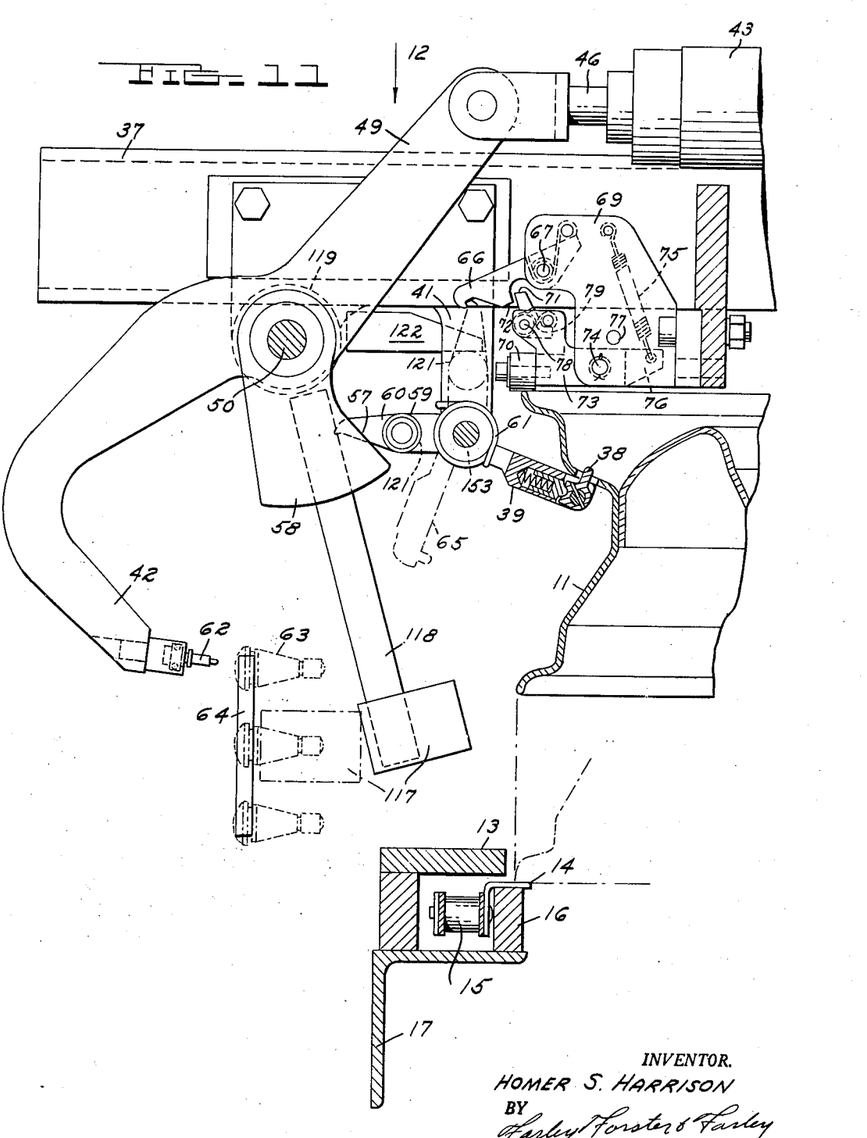
Fig. 11 is an enlarged end elevation of the valve insert mechanism per se shown in Fig. 3.
Figure 12:
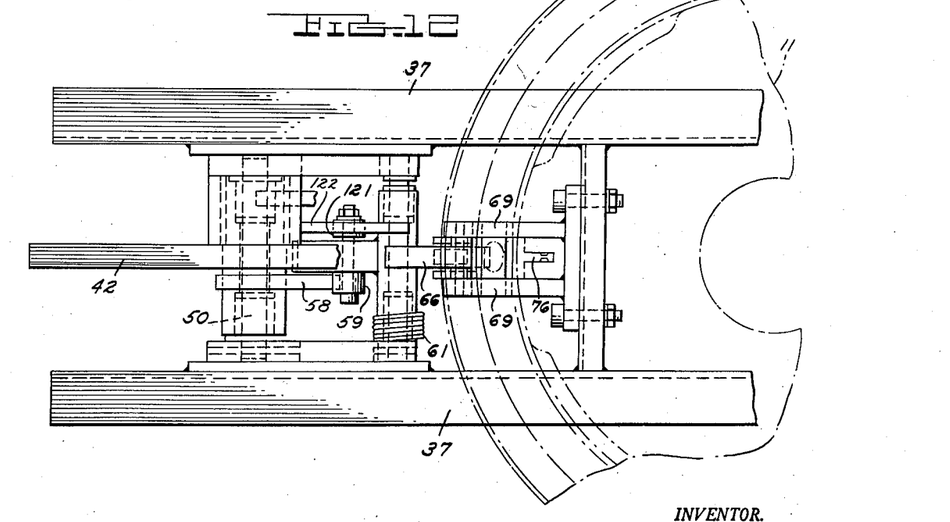
Fig. 12 is a fragmentary plan view taken along the line 12 of Fig. 11.

The outer end of the valve insert lever 42 is provided with a cylindrical plunger 62, best shown in Fig. 11, which is adapted to enter the axial passage at the inner end of a valve body 63 frictionally held in a slotted rotatable valve fixture 64, remove the valve from such fixture and transfer it into the valve hole in the wheel 11, the arm 39 being moved to the retracted clearance position shown at 65 during the progress of the valve 63 toward the wheel 11. The valve body is inserted with a pressure limited by a pressure switch 154 (Fig. 15) associated with the air cylinder 43 which initiates the retraction cycle for the valve insert arm lever 42.

The lever 39 is held in its retracted position 65 by a latch 66 pivotally mounted at 67 to a stationary bracket 68 and remains in such retracted position until a new wheel is raised against the roller 70 to effect a release of the latch 66 through engagement of dog 71 with the latch extension 72, the roller 70 and dog 71 being mounted on a lever 73 which is pivotally mounted at 74 to the stationary bracket 69. Upon downward travel of a wheel 11, spring 75 acting on an extension 76 of the lever 73 moves the roller to a lower position limited by a stop 77 causing the dog 71, which is pivotally mounted at 78, to trip past the extension 72 against the tension of spring 79 thereby setting the dog 71 so that upon the next upward movement of the roller 70 and lever 73, the dog 71 will disengage the latch 66.

Figure 4:
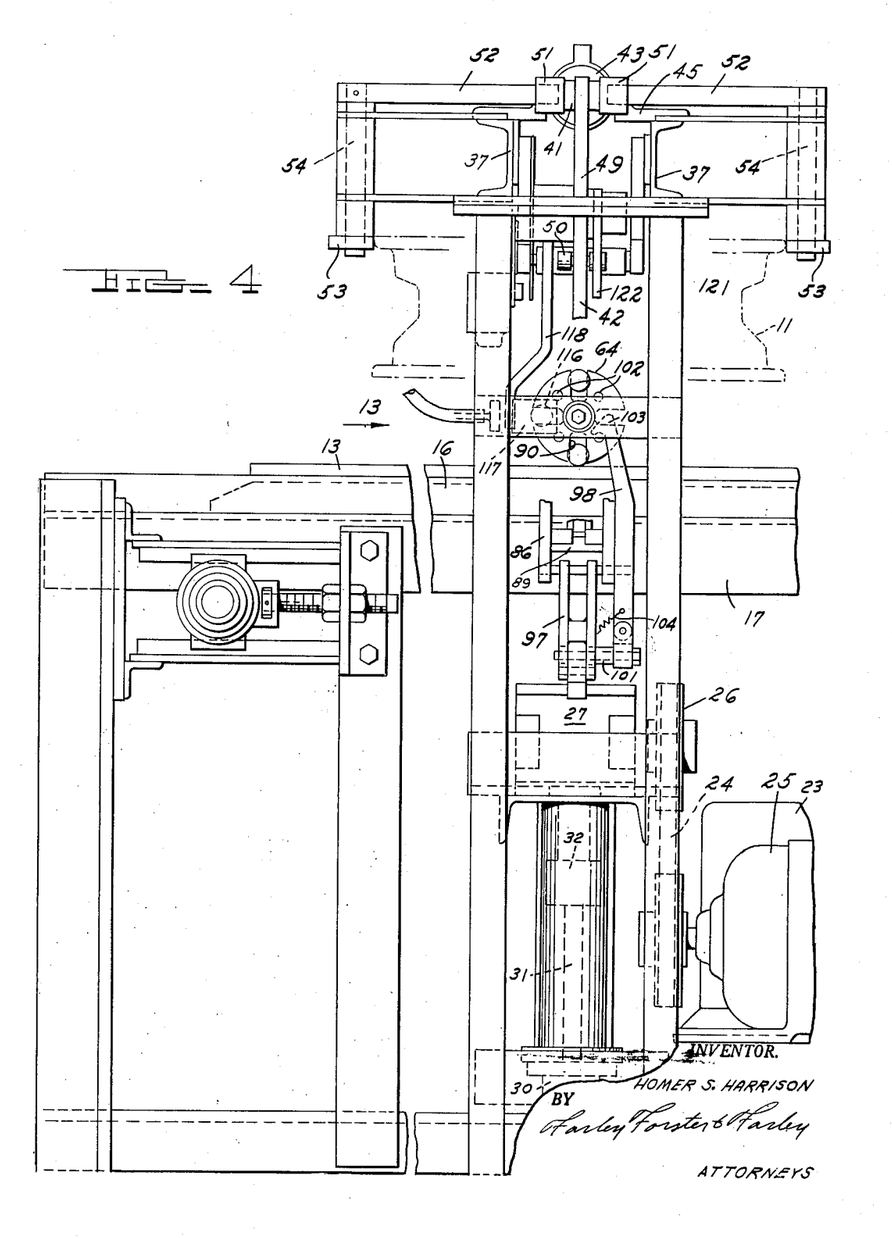
Fig. 4 is a side elevation taken along the line 4 of Fig. 1.
Figure 13:
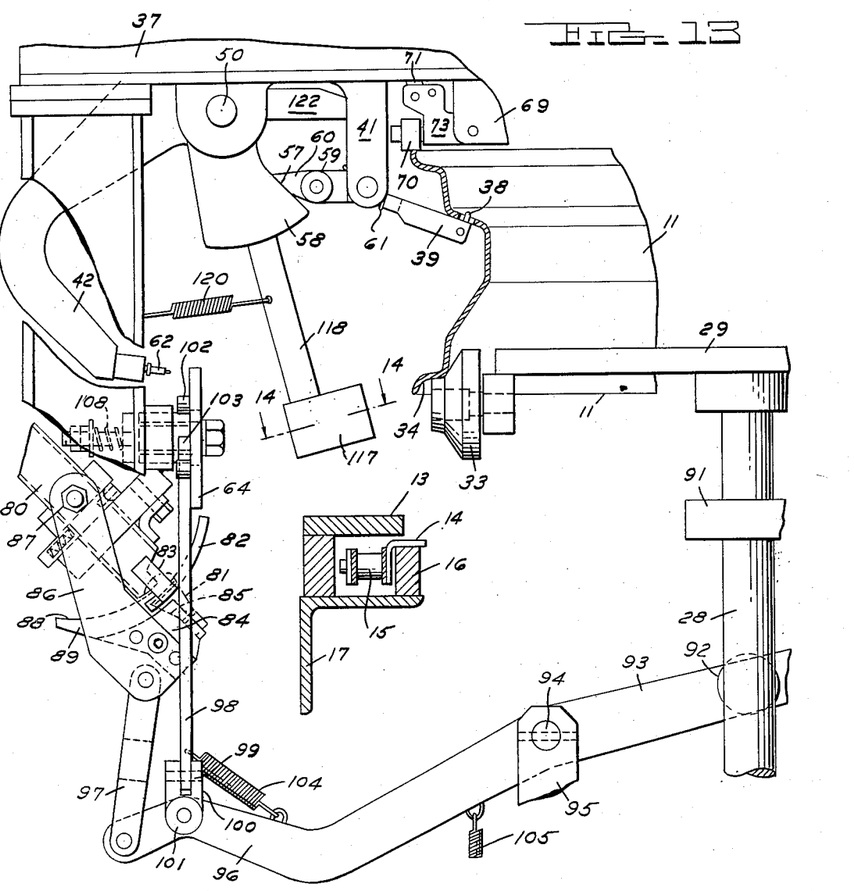
Fig. 13 is a view similar to Fig. 11 illustrating portions of the valve feeding mechanism omitted in Fig. 11.

The valve fixture 64 is progressively loaded and indexed by mechanism best shown in Figs. 4 and 13. Valves are gravity fed through a supply chute 80 to a position shown at 81 between a pair of arcuate guides 82 which engage the lip of the rubber flange at the enlarged end of the valve body. The guide bars 82 are mounted in fixed spaced relationship at the end of the chute 80 by brackets 83 and provide central clearance for passage of a valve pusher dog 84 having a contoured face 85 adapted to engage the side of the valve body. The pusher dog 84 is mounted between a pair of arms 86 pivotally connected at 87 to a fixed member on a center corresponding to the radial center of the fixed guides 82.

The arcuate face 88 of a rearward extension 89 of the dog 84 serves to close the lower end of the chute 80 when the arms 86 are moved upwardly to push the valve along the guides 82 and into a serrated slot 90 in the valve fixture 64, the serrated surface of the slot 90 serving to frictionally engage the perimeter of the outermost rubber flange of the valve body from which position it may be removed by the valve insert lever, as previously described, when properly indexed to the uppermost position on the valve fixture.

The arms 86 are swung upwardly each time a wheel is lowered through engagement of a collar 91 on the shaft 28 with a roller 92 on a lever 93 pivoted at 94 on fixed bracket 95, the lever end 96 acting through pivotally connected link 97 to actuate the arms 86. A ratchet arm 98 pivotally connected at 99 to a bracket 100 on an extension 101 at the lever end 96 is raised by such lever end to engage one of the four pins 102 projecting from the inner face of the valve fixture 64, a hook end 103 of the ratchet arm 98 being urged by spring 104 into actuating position so that upon downward movement of the lever end 96 effected by spring 105 anchored at 106 to the frame of the machine as shown in Fig. 3, the fixture 64 will be indexed 90° to a position with an empty slot 90 at a lowermost receiving position. As is also shown in Fig. 3, an adjustable stop 107 mounted on the frame of the machine limits the downward travel of the lever arm end 96. The fixture 64 is pivotally mounted under the adjustable load of compression spring 108 to provide adequate frictional resistance to assure that the hook end 103 of the ratchet arm 98 will ratchet past a pin 102 during its upward travel without backward travel of the fixture 64.

Figure 8:
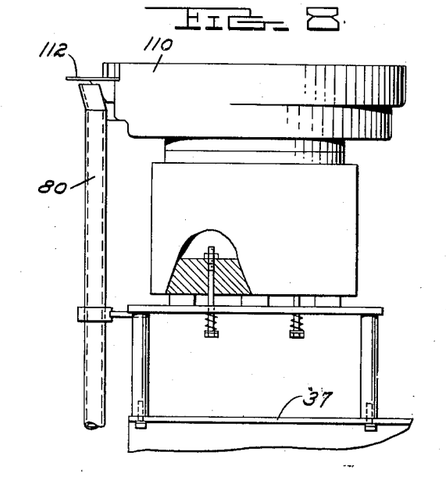
Fig. 8 is a side elevation of the valve hopper mounted on top of the machine shown in the other views.
Figures 9, 10:
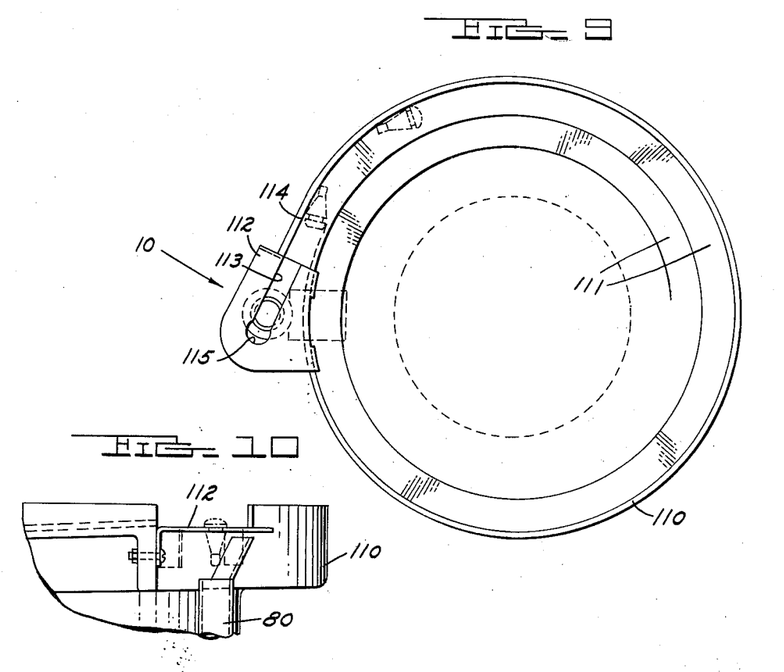
Fig. 9 is a plan view of the valve hopper.
Fig. 10 is a fragmentary side elevation taken along the line 10—10 of Fig. 9.

Valves are fed into the chute 80 from a hopper 110 best shown in Figs. 8 to 10 which is vibrated to cause valves from the center of the hopper to be fed up a spiral ramp 111 onto a track 112 which is provided with a slot 113 wide enough to pass all but the outermost flange 114 of the valve body thereby causing the narrow end of the valve to drop to proper axial alignment with the chute as it moves along the track 112 to an enlarged opening 115 which permits the valve to drop freely into the chute.

Figure 14:
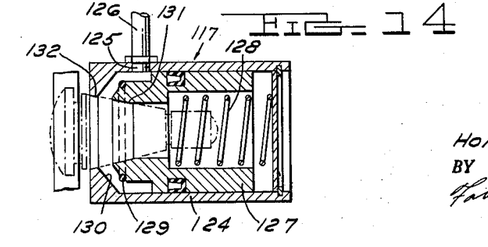
Fig. 14 is a sectional view of the valve lubricating mechanism taken along the line 14—14 of Fig. 13.

From the above description, it will be understood that during each cycle of the machine, one valve is removed from the uppermost slot in the valve fixture 64, another valve is inserted in the lowermost slot and the fixture 64 is indexed 90°. It thus requires two cycles of the machine to move a valve from the lowermost loading position of the fixture 64 to the uppermost insert position, each valve being held in a slot having a horizontal position as shown at 116 in Fig. 4 during the cycle intermediate loading and insert. While in this position, a soaping operation is effected to lubricate the valve body in order to facilitate its insertion in the succeeding cycle and minimize the possibility of tearing the rubber on any sharp edge of the valve hole in the wheel. This lubricating operation is effected by soaping unit 117, as best shown in Figs. 11 and 14, which is carried on an arm 118 fixed to a sleeve 119 piloted on the shaft forming the pivotal axis 50 for the insert arm 42 and free to pivot independently of such insert arm. As shown in Fig. 3, a spring 120 urges the arm 118 and soaping unit 117 into engagement with an intermediate valve on the fixture 64, and, as best shown in Fig. 11, a roller 121 on the opposite side of the roller 59 engages a lever arm 122 also connected to the sleeve 119 holding the arm 118 in a retracted position (Fig. 11) whenever the lever 60 is in its latched position. Accordingly, the lubricating operation will take place between the time that a new wheel is raised into engagement with the roller 70 releasing the latch 66 and the time when the lever 60 is raised into latching position by movement of the valve insert arm 42, and the lubricating unit will be held in retracted position during the remainder of the cycle.

Referring to Fig. 14, the lubricating unit 117 consists of a valve body 124 having a port 125 communicating with a flexible line 126 leading from a supply of lubricating fluid (not shown) together with a slidable valve spool 127 urged by a light spring 128 toward a position where an O-ring 129 provides sealing contact with a beveled end 130 in the valve body. When the unit is brought into engagement with a valve, the tapered side wall 131 of the valve engages a corresponding tapered opening in the spool 127 moving the same back against spring 128 to permit soaping fluid to flow past the O-ring seal 129 into engagement with the exposed side wall of the valve where lubrication is most required upon insertion in the valve hole of a wheel. During such lubricating operation, a further engagement of the tapered valve body at 132 forms a seal to prevent flow of fluid out of the lubricating unit. When the unit is retracted the spring 128 again restores the valve cylinder 127 to the sealing position of the O-ring 129.

Figure 5:
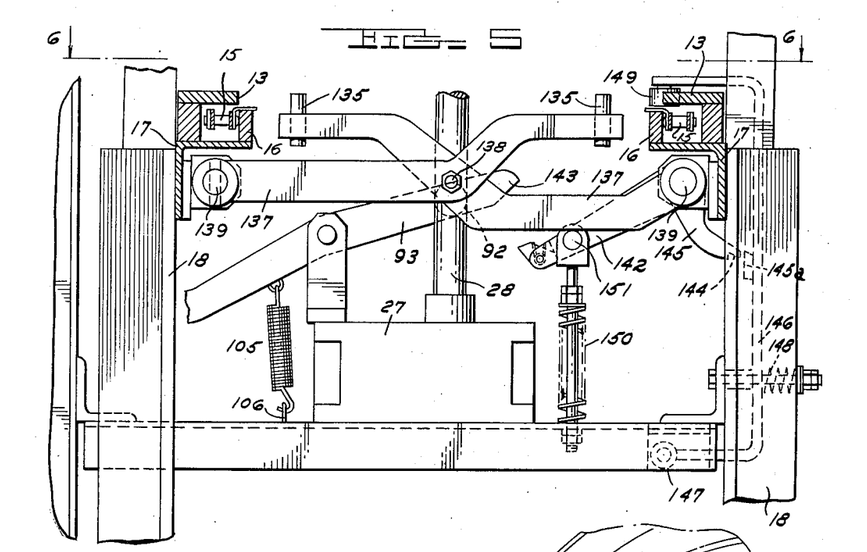
Fig. 5 is a fragmentary end elevation taken along the line 5 of Fig. 6.
Figure 6:
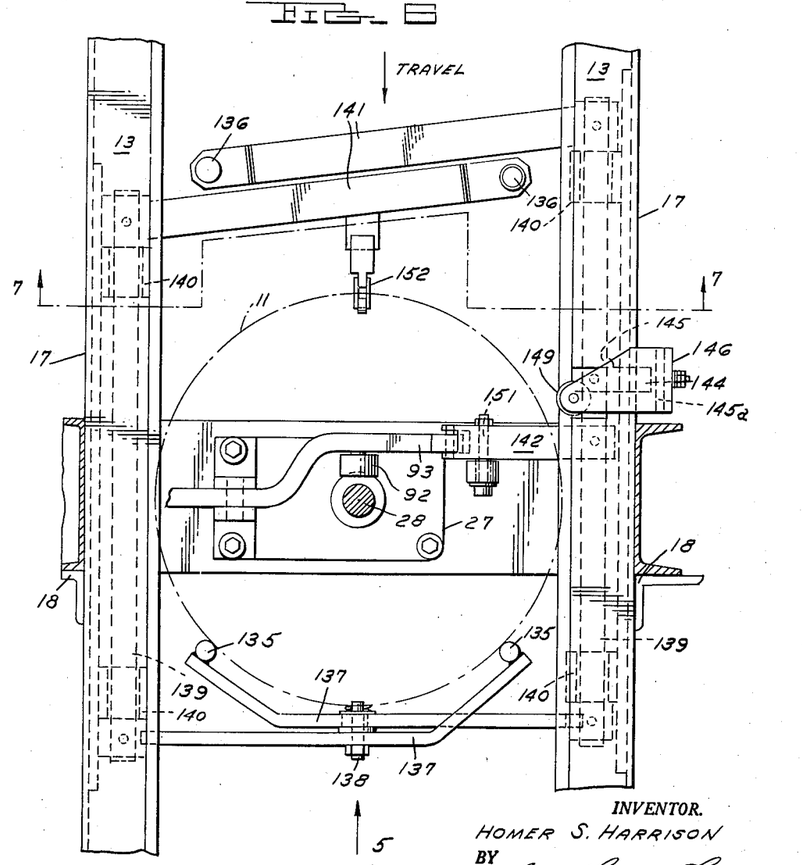
Fig. 6 is a fragmentary plan view taken along the line 6—6 of Fig. 5.
Figure 7:
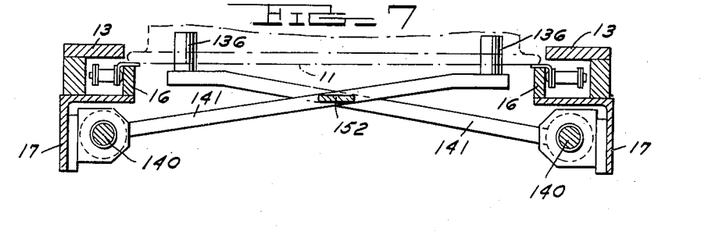
Fig. 7 is a fragmentary end elevation taken along the line 7—7 of Fig. 6.

With reference to Figs. 5, 6 and 7, wheel travel on the conveyor is controlled by retractable stop pins including a pair of forward stop pins 135 and a pair of rear stop pins 136. The forward stop pins 135 are positioned to locate a wheel on the axis of the platten 29 preparatory to raising it, while the rear stop pins 136 are positioned to hold any following wheels on the conveyor until the valve inserting operation is completed on the preceding wheel. The forward stop pins are mounted on a pair of transverse arms 137 pivotally connected at 138, the ends of which are rigidly connected to a pair of longitudinal shafts 139 rotatably mounted in bearings 140. The rear ends of the shafts 139 are rigidly connected to a pair of transverse arms 141 which carry the rear stop pins. An actuating lever arm 142 connected to one of the shafts 139 serves to control the position of all four stop pins simultaneously either in a blocking position above the level of the conveyor surface as shown in Figs. 5 and 7, or upon downward movement of the lever arm 142, in a retracted position permitting a wheel to pass. The lever arm 142 is depressed to a retracting position by the engagement of an extension 143 of the lever arm 93 whenever a wheel is lowered into the conveyor after valve insertion, and the arm 142 is held in such retracted position by latch 144 at the end of arm 145 upon engaging detent 145a on arm 146 pivoted at 147 and normally held in the position shown by spring 148. A roller 149 at the upper end of the arm 146 located in the path of a wheel approaching a position under the valve inserting head serves to move the arm 146 to a latch releasing position permitting compression spring 150 pivotally connected at 151 to the lever arm 142 to return the lever arm and stop pins to their wheel blocking position. A limit switch 152 mounted on one of the rear stop pin arms 141 is located for contact by the lower trailing edge of a wheel rim after the stop pin arms have been raised to blocking position by the tripping action of roller 149 and such limit switch serves to initiate the wheel raising and valve inserting cycle.

Figure 15:
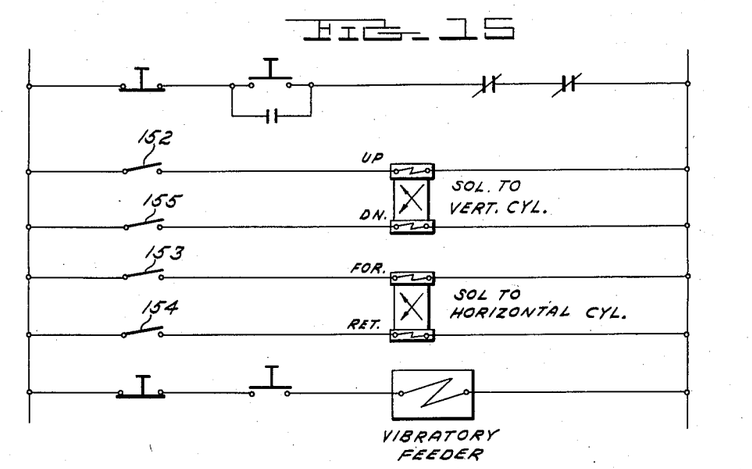
Fig. 15 is a schematic electrical diagram of the control circuit.
Figure 16:
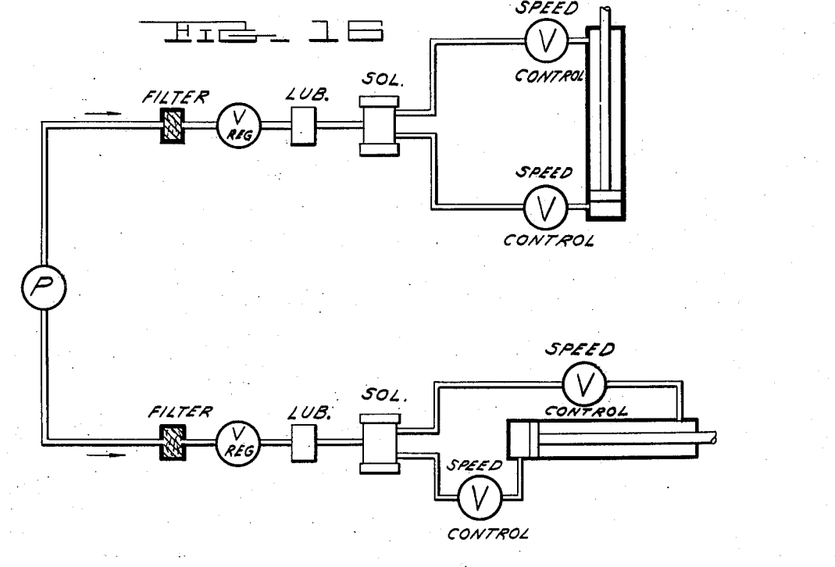
Fig. 16 is a schematic diagram of the pneumatic circuit for operating the two air cylinders employed in the machine.

From the above description, it will be seen that the conveyor and wheel platten run continuously whenever the machine is in operation while all cycles of operational movement are derived from two air cylinders, the vertical cylinder 30 being adapted to raise and lower the wheel platten and the horizontal cylinder 43 being adapted to actuate the valve insert lever arm 42. As shown in Fig. 15, two solenoid valves serve to control the upward and downward movement of the vertical cylinder, and forward and return movement of the horizontal cylinder, respectively, in response to four limit switches. As previously mentioned, limit switch 152 initiates the upward movement of the vertical cylinder; limit switch 153, responsive to wheel inertia on the arm 39 upon engagement of the dog 38 in the valve hole of a wheel, serves to initiate a forward cycle of the horizontal cylinder 43; air pressure responsive switch 154 serves to reverse the horizontal cylinder; and a limit switch 155 responsive to return of the horizontal cylinder initiates the downward movement of the vertical cylinder.

Operation

Referring to Figs. 1 and 6, a wheel traveling on a conveyor surface 14 at the incoming end of the machine will be stopped by pins 136 projecting above the level of the conveyor as shown in Fig. 7, until the preceding wheel is lowered causing collar 91 on the shaft 28 to engage roller 92, depressing lever 93 (see Figs. 3 and 13) causing lever end 143 to depress lever 142 rotating shafts 139 and stop arms 137 and 141 to a stop retracting position maintained by engagement of latch 144 with detent 145a on lever 146. With the stop pins 135 and 136 in retracted position, such preceding wheel is free to travel on the conveyor to the unloading end of the machine and the oncoming wheel is free to travel past the stop pins 136, the leading edge of the wheel over-passing limit switch 152 due to the depressed position of stop arms 141. Just after the trailing edge of the wheel has over-passed stop pins 136, the lower side edge of the rim will contact roller 149 moving lever arm 146 outwardly to release the latch 144 permitting the spring 150 to return lever arm 142 and the stop pins 135 and 136 to their blocking position. As the leading edge of the wheel approaches stop pins 135, the trailing edge engages limit switch 152 actuating the vertical cylinder solenoid (Fig. 15) to its up position causing piston rod 31 of the vertical cylinder 30 (Fig. 3) to raise the rotating shaft 28 and wheel platten 29 together with a wheel accurately located thereover by stop pins 135. The contoured rollers 33 engaging the lower flange 34 of the wheel and the frictional resistance to rotation of the rollers 33 imparting an accelerating rotation to the wheel during its upward travel.

The upward travel of the shaft 28 and collar 91 thereon permits spring 105 to pull the lever end 96 downwardly into engagement with the stop 107 thereby pulling the ratchet arm 98 downwardly to produce a 90° rotational indexing of the valve fixture 64 (Figs. 4 and 13) through engagement of the ratchet hook 103 with one of the four pins 102. During such indexing movement of the fixture 64, a freshly lubricated valve is moved from the position shown at 116 to the uppermost position on the fixture for pickup by the valve insert arm 42 (Fig. 11), an empty slot 90 is moved to lowermost position of the disk, and retraction of the pusher dog 84 permits a valve in chute 80 to drop into loading position between guide rails 82 (Fig. 13). The same indexing movement of the fixture 64 moves a previously loaded valve from the lowermost slot position to a horizontal slot position shown at 116 for the lubricating operation.

With the lever 39 (Fig. 11) held in retracted clearance position 65 by the latch 66, continued upward movement of the rotating platten 29 and wheel thereon (Fig. 13) causes the upper edge of the wheel to engage roller 70 moving the lever 73 upwardly to cause dog 71 (Fig. 11) to engage projection 72 and release the latch 66 permitting spring 61 to move lever 39 and the hole locating dog 38 at the end thereof into contact with the wheel. Corresponding movement of the lever extension 60 and roller 121 thereon releases the lever extension 122 and permits the associated arm 118 to be drawn by spring 120 (Fig. 3) into valve lubricating position wherein the soaping unit 117 engages the valve body in the horizontal slot 116 of the valve fixture 64 (Fig. 4) resulting in the application of soaping fluid from supply line 126 (Fig. 14) to the body of the valve.

The upward movement of the wheel is limited by engagement with anti-friction rollers 35 which permit continued rotation of the wheel until the dog 38 engages the valve hole arresting further rotation of the wheel. The inertia of the wheel acting against lever arm 39 upon such engagement of the dog 38 actuates limit switch 153

(Fig. 15) and the solenoid valve for the horizontal cylinder to a forward position causing the piston rod 46 of the horizontal cylinder 43 to actuate lever extension 49 and the valve insert lever 42 (Fig. 11) in a valve insert direction. Initial forward movement of the piston 46 moving stops 51 out of engagement with the bell crank arms 52 (Fig. 1) permitting springs 56 to pull brake elements 55 carried on arms 53 into braking engagement with the rim of the wheel. Continued forward movement of the piston rod 46 causes the valve engaging projection 62 (Fig. 11) on the end of the valve insert arm 42 to engage the central aperture in valve 63 in uppermost position on the fixture 64, remove such valve from the disk, and transport it in an arc leading to the valve hole in the wheel. During such travel, the cam face 57 on projection 58 engages roller 59 on the lever extension 60 retracting the lever 39 to clearance position 65 maintained by engagement of the lever extension 60 with the latch 66, the final travel of such lever extension causing roller 121 to engage lever extension 122 retracting the soaping unit on 118 to an inoperative clearance position as shown in Fig. 11.

Final travel of the valve insert arm 42 presses the valve 63 into assembled position in the wheel with a pressure limited by pressure switch 154 (Fig. 15) which initiates the return cycle of the horizontal cylinder 43. Final return travel of the piston 46 effects release of the wheel brakes 55 (Fig. 1) and actuates limit switch 155 (Fig. 15) to initiate the downward cycle of the vertical cylinder 30. Initial downward movement of the wheel releases engagement with the roller 70 (Fig. 11) and permits spring 75 to return lever 73 to a lower position limited by stop pin 77 and the dog 71 trips past the projection 72 as permitted by spring 79 (so that upward engagement of roller 70 by a succeeding wheel may produce an unlatching engagement between dog 71 and projection 72). Continued downward movement of the shaft 28 (Fig. 13) brings collar 91 into engagement with roller 92 actuating the lever arm extension 93 to raise the lever end 96, the link 97, the ratchet arm 98, and the valve loading arm 86, the dog 84 moving a valve 81 along guides 82 and pressing it into engagement in the lowermost serrated slot of the valve fixture 64. Final downward travel of the lever arm extension 93 brings the end 143 (Fig. 5) into engagement with the lever 142 moving stops 135 and 136 (Fig. 7) into retracted position whereupon the lowered wheel with valve assembled thereon may proceed on the conveyor to the unloading end of the machine thereby completing the cycle.

While a preferred embodiment of a completely automatic valve inserting machine has been disclosed and described above in detail, it will be understood that numerous modifications might be resorted to without departing from the scope of my invention as defined in the following claims.

I claim:

1. A tubeless tire wheel valve inserting machine comprising a frame, means mounted on said frame for transporting wheels consecutively to a valve inserting location, means mounted on said frame at said location for rotating a wheel to a predetermined valve inserting position, means reactively mounted on said frame having a sensing member in the path of valve hole rotation for stopping said rotation when a valve hole in the wheel reaches said valve inserting position comprising resiliently mounted dog means adapted to engage a rotating wheel along a radial arc intersecting the valve hole, said dog means being adapted to engage the valve hole when it reaches the said valve inserting position, means mounted on said frame for feeding valves consecutively to a position adjacent said valve inserting position, and means mounted on said frame for moving a valve from said adjacent position into assembled position in said wheel hole.

2. A machine as defined in claim 1 including electrical switch means responsive to the inertia forces of said wheel upon engagement of said dog means in said valve hole, and means responsive to said switch means for initiating the valve inserting cycle of said machine.

3. A machine as defined in claim 1 including brake means adapted to engage said wheel after it has been stopped by said dog means for preventing further wheel rotation during the valve inserting cycle of said machine.

4. A machine as defined in claim 1 wherein said means for moving a valve includes a pivoted lever having a valve engaging end with a path of travel intersecting the valve hole in said wheel when in the stationary position established by said dog, means being provided responsive to the movement of said lever for retracting said dog means from said valve hole prior to valve insertion therein.

5. A machine as set forth in claim 1 including latch means for holding said dog means in a retracted position out of the path of said wheel, and latch releasing means responsive to movement of a wheel toward a valve inserting position.

6. A machine as defined in claim 1 wherein said means for moving a valve includes a pivoted lever having a valve engaging end with a path of travel intersecting the valve hole in said wheel at said valve inserting position.

7. A machine as defined in claim 6 wherein said means for moving said valve includes an air cylinder for actuating said lever through insert and retraction cycles, a solenoid actuated valve for controlling respective insert and retraction cycles for said lever, and a pressure switch responsive to the establishment of a predetermined pressure in said air cylinder for initiating the retraction cycle of said lever.

8. A machine as defined in claim 6 wherein said means for feeding valves consecutively to a position adjacent said inserting position includes an index fixture adapted to releasably hold a plurality of valves, said fixture being movable to successive positions for moving successive valves into the path of travel of said valve engaging lever end.

9. A machine as defined in claim 8 wherein said means for feeding valves includes a chute employing gravity feed and positive mechanical feed means for moving valves consecutively from the lower end of said chute into said valve holding fixture.

10. A machine as defined in claim 8 wherein said fixture is provided with a valve lubricating station, and means for lubricating each valve when it reaches said station.

11. A machine as defined in claim 10 wherein said lubricating means comprises a container supplied with lubricant, a wheel valve aperture in said container, a lubricant valve within said container actuated by engagement with a wheel valve in said aperture, said lubricating valve being adapted to stop the flow of lubricant in the absence of a wheel valve in said aperture, and means for moving said container into lubricating engagement with a wheel valve positioned at said lubricating station.

12. A tubeless tire wheel valve inserting machine comprising conveyor means for transporting wheels consecutively to a predetermined conveyor location, means at said conveyor location for raising and rotating a wheel to a predetermined valve inserting position comprising a continuously rotating member adapted to engage a wheel and raise it above the conveyor surface, means at said inserting position for stopping said rotation when a valve hole in the wheel reaches said valve inserting position, means on said machine for feeding valves consecutively to a position adjacent said valve inserting position, and means operatively associated with said last means for moving a valve from said adjacent position into assembled position in said wheel hole.

13. A machine as defined in claim 12 wherein the rotating member adapted to engage a wheel and raise it above the conveyor surface includes a plurality of rollers having bearings mounted on said member, adapted to engage the rim of a wheel and through bearing drag to accelerate rotation of the wheel during its upward travel.

14. A machine as defined in claim 13 wherein antifriction rollers are adapted to limit the upward travel of the wheel while permitting continued rotation thereof.

15. A tubeless tire wheel valve inserting machine comprising means for moving a wheel to a predetermined valve inserting position fixing the axis of said wheel, a circumferential plane of the wheel, and the circumferential position of the valve hole in said wheel and second means for moving a valve from a bulk supply location into assembled position in the wheel at said fixed valve hole location, said second means having a valve holding member, said member defining an arcuate path to facilitate valve insertion.

16. A tubeless tire wheel valve inserting machine comprising a conveyor for moving the axis of the wheel to a valve inserting location, an air cylinder for moving a circumferential plane of the wheel to a valve inserting position, means for rotating the wheel circumferentially to move its valve hole to a valve inserting position, combined gravity feed and mechanical means for moving a valve from a bulk supply location into assembled position, and air cylinder means for actuating said mechanical means.

17. A tubeless tire wheel valve inserting machine comprising means for moving a wheel to a predetermined valve inserting position fixing the axis of said wheel, a circumferential plane of the wheel, and the circumferential position of the valve hole in said wheel and means for moving a valve from a bulk supply location into assembled position in the wheel at said fixed valve hole location, said means for moving a valve including a pivotally mounted valve insert arm having a valve engaging end with a path of travel intersecting the valve hole of said wheel in said predetermined position, and mechanical means for positioning a valve in the path of said valve engaging end.

18. A tubeless tire wheel valve inserting machine comprising conveyor means for moving the axis of a wheel to a valve inserting location, air cylinder means for moving a circumferential plane of the wheel to a valve inserting position, means for rotating said wheel on said axis, means responsive to the circumferential movement of the valve hole in said wheel to a predetermined valve inserting position for stopping said rotation, gravity chute means for moving a valve from a bulk supply location to a predetermined feed position, mechanical means actuated by said air cylinder means for moving said valve to a further station, second air cylinder means and mechanical means actuated thereby for moving said valve from said further station into assembled position in said wheel.

References Cited in the file of this patent

UNITED STATES PATENTS

| | | |
|---|---|---|
| 2,095,931 | Kraft | Oct. 12, 1937 |
| 2,243,379 | Johnson | May 27, 1941 |
| 2,500,013 | Svensson | Mar. 7, 1950 |
| 2,533,113 | Henry | Dec. 5, 1950 |
| 2,604,692 | Broden | July 29, 1952 |
| 2,665,747 | Harrison | Jan. 12, 1954 |
| 2,683,924 | Schryver | July 20, 1954 |
| 2,713,713 | Tubbs | July 26, 1955 |
| 2,756,490 | Sawdey | July 31, 1956 |